United States Patent
Judd

(10) Patent No.: US 11,005,542 B2
(45) Date of Patent: May 11, 2021

(54) PASSIVE BEAM MECHANICS

(71) Applicant: Mano D. Judd, Heath, TX (US)

(72) Inventor: Mano D. Judd, Heath, TX (US)

( * ) Notice: Subject to any disclaimer, the term of this patent is extended or adjusted under 35 U.S.C. 154(b) by 0 days.

(21) Appl. No.: 16/999,366

(22) Filed: Aug. 21, 2020

(65) Prior Publication Data

US 2021/0067208 A1 Mar. 4, 2021

Related U.S. Application Data

(60) Provisional application No. 62/895,574, filed on Sep. 4, 2019.

(51) Int. Cl.
*H04L 5/12* (2006.01)
*H04B 7/0426* (2017.01)
*H04B 17/11* (2015.01)
*H04B 1/00* (2006.01)

(52) U.S. Cl.
CPC ........... *H04B 7/043* (2013.01); *H04B 1/0028* (2013.01); *H04B 17/11* (2015.01)

(58) Field of Classification Search
CPC ....... H04B 7/043; H04B 17/11; H04B 1/0028
USPC .......................................................... 375/262
See application file for complete search history.

(56) References Cited

U.S. PATENT DOCUMENTS

| | | | |
|---|---|---|---|
| 5,973,601 A * | 10/1999 | Campana, Jr. ..... | G08B 21/0222 340/573.4 |
| 9,954,563 B2 * | 4/2018 | Woodsum ................ | H04B 1/18 |
| 2020/0091608 A1 * | 3/2020 | Alpman ................. | H01Q 21/24 |

* cited by examiner

*Primary Examiner* — Don N Vo

(57) ABSTRACT

Invention that uses over-sampling of the Analog to Digital Converter to produce additional synthetic vector signal samples that are used to construct high dimensional Signal Data Vectors and Calibration Steering Vectors, that are used to synthetically increase the effective size of the original real array which results in the generation of a narrower array beamwidth.

17 Claims, 15 Drawing Sheets

1) First, compute:
   $k_1 = X_3(t_1)/X_1(t_2)$

2) Create the First Synthetic Antenna Element by Multiplying $k_1$ by $X_2(t_2)$.

3) Create the Second Synthetic Antenna Element by Multiplying $k_1$ by $X_3(t_2)$

PRIOR ART

Figure 2. Antenna Model

Designation of an
Antenna Element

Realized by an <u>Effective Area</u> ("sheet") in Space.

Antenna Effective Capture Area = X * Y

Note:
<u>Effective Area</u> does <u>not</u> necessarily
Equal the Antenna's <u>Physical Area</u>.

Figure 3. Antenna Array Model

Equivalent Effective Area of the Antennas. This is the Array Aperture.

Array Aperture Area = M * X * Y

Figure 4. Synthetic Array Goal - Example

Array of 2 Real Elements.

Figure 5. Three Antenna Element Model

1) First, compute:
    $k_1 = X_3(t_1)/X_1(t_2)$

2) Create the First Synthetic Antenna Element by Multiplying $k_1$ by $X_2(t_2)$.

3) Create the Second Synthetic Antenna Element by Multiplying $k_1$ by $X_3(t_2)$

PASSIVE BEAM MECHANICS

The present application claims priority to the earlier filed provisional application having Ser. No. 62/895,574, and hereby incorporates subject matter of the provisional application in its entirety.

BACKGROUND

In traditional RADAR systems, Communications systems, Direction Finding systems, and other applications which use directive antennas or directive arrays, the conventional Half Power Beam Width (HPBW) or the Antenna or Array is equal to $\lambda/L$ (in radians), where L is the maximum [projection] dimension of the array perpendicular to the propagating signal direction, and $\lambda$ is the wavelength of the signal. Note, this wavelength is relative to the carrier frequency of the wave, and not the signal bandwidth. For many applications, a narrower beamwidth would be desired, since this would reduce interference levels as well as reject unwanted or undesired signals, arriving from directions not along the line from the desired source and receiver.

In many cases, the effective size of the Antenna or Array, L, can be limited both by either physical constraints, or even by cost. The cost of an M element Phased Array System increases linearly by the value of M. For example, for a narrowband array of elements spaced roughly a half-wavelength from each other element, with M=4, the physical size of the array would be (M−1) multiplied by $\lambda/2$, or roughly $3*\lambda/2$ in size. This array would produce a beamwidth of $2/(3*\lambda/2)$ radians or 38.2 degrees. Within this spatial range, most signals incident from the similar direction would be absorbed by the receive antenna or array, and if similar in power to the desired signal, would strongly interfere with this signal. Reduction of this effective beamwidth would strongly aid in improving the Signal to Interference (Noise) Ratio, or SINR.

For Radar Systems, one of the major limitations is the effective Clutter Return. This is the summation of interfering signals that are reflected from the clutter source, such as the ground or Earth. Reduction of the received beamwidth amounts to a significant reduction in the clutter noise return, which highly improves the detection range of the radar system. Additionally, the accuracy of the predicted target location is a function of the radar beamwidth. A narrower beamwidth thus produces a more accurate estimated beam angle for the radar return, and therefore a more accurate target location estimate. Therefore, in many Radar applications, it is highly desired to reduce the effective beamwidth of the received radar beam, for multiple benefits. To date, this has been limited by the choice of the carrier frequency $f_c$, which is $c/\lambda$ (c=speed of light); and therefore a function of $\lambda$, or to increase the size of the physical array, L. This same limitation applies also to acoustic signal detection and location, for example, in underwater anti-submarine warfare. In this case the propagation velocity is the speed of sound in water, or in air (for air based acoustic systems).

BRIEF SUMMARY OF THE INVENTION

In this invention, over-sampling of the received signal above the traditional Nyquist Sampling Rate, using a High Speed Analog to Digital Converter (ADC) is used to produce additional vector signal samples that are used to construct higher dimensional Signal Data Vectors and Calibration Data Vectors, that are used to synthetically increase the effective size of the original (real, versus synthetic) antenna or array, which results in the construction or generation of a narrower beamwidth. The limit of this beamwidth reduction is only limited by the ratio, P, of the oversampled data rate to the original Nyquist Rate.

Major applications for the technology include Radar, Direction Finding, and RF Communications. It should be noted that this technology is also applicable for use in Acoustics, such as underwater detection and location of signals, or for (air) acoustic communications.

DETAILED DESCRIPTION AND BEST MODE OF IMPLEMENTATION

Figure 1:
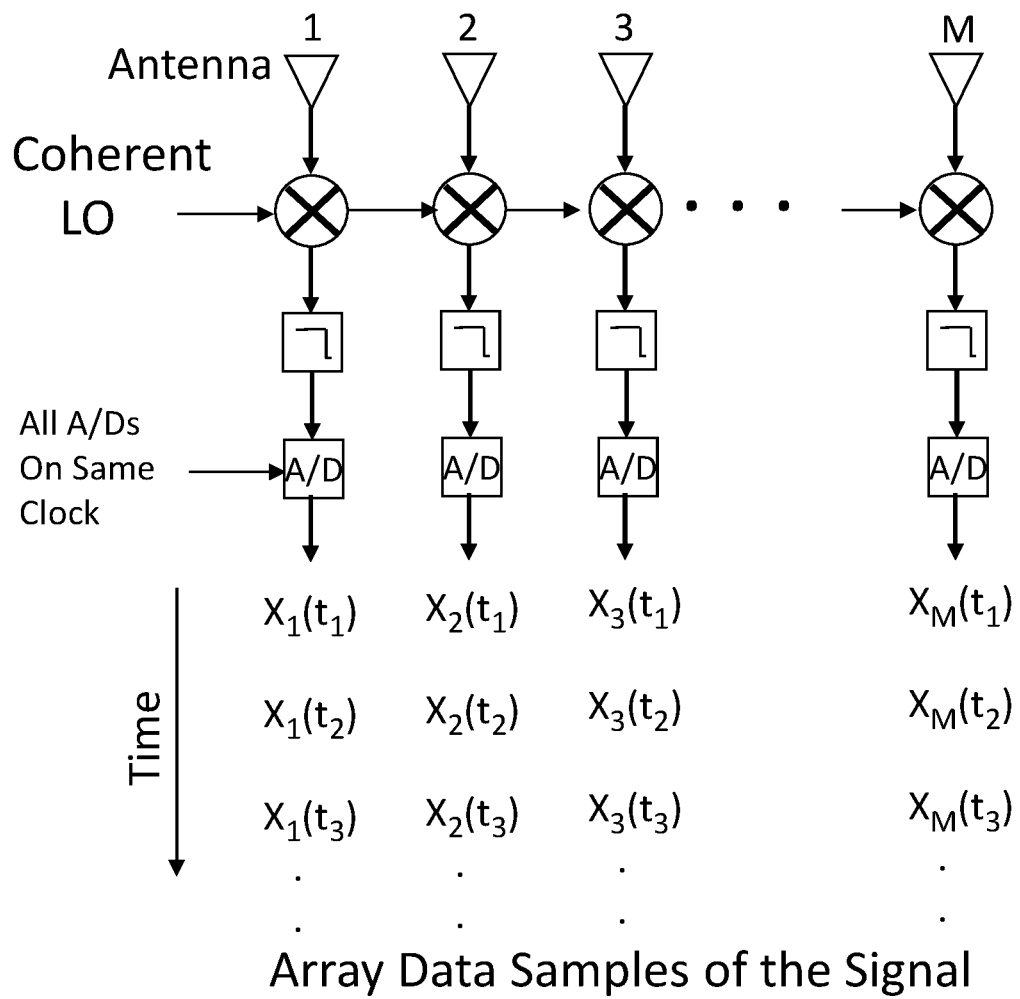
FIG. 1 shows a Conventional RF Downconversion and Sampling Mechanism.

The Diagram in FIG. 1 shows a Conventional RF downconversion and sampling system, used in most RF Array applications. This consists of a multiplicity of M antennas, M RF Conversion/mixing blocks, each followed by a Low-Pass RF or IF Filter and finally an Analog to Digital Converter (ADC) for each RF channel. Each channel, i=1, . . . , M, generates a sample of the incident (and downconverted) signal, which can be modeled as a data vector:

$$\underline{x}(t) = s(t) \cdot \underline{a}(\theta, \phi, f) + \underline{n}(t)$$

Where $s(t)$=the baseband signal, received and downconverted, on each i channel $\underline{a}(\theta, \phi, f)$=array steering vector, for a far field signal at azimuth angle, $\theta$, elevation angle, $\phi$, and carrier frequency f.

$\underline{n}(t)$=noise vector, as a function of time.

In this model, the noise is assumed uncorrelated from sensor (antenna) to sensor, as well as uncorrelated from one (time) snapshot or sample to the next.

It is assumed at this point, that the effective sample rate has also been decimated such that the effective sample rate is twice the bandwidth of the desired signal, $s(t)$. We therefore assume that the decimated data rate, equivalent to twice the desired signal bandwidth, is:

$$f_s = \frac{1}{\Delta t}$$

where $\Delta t$ is the time duration (or period) of a single ADC sample or snapshot. Note, that $f_s$ can be greater than twice the signal bandwidth of s(t), but should not be less than twice the bandwidth of s(t).

For example, in FIG. 1, the first component of the data vector, $\underline{x}(t)$, would be $x_1(t_1)$. This represents the converted signal from the $1^{st}$ antenna (channel), at time $t_1$. The time stamp, $t_1$, simply represents an initial start time for the data vector, and is relative across all antennas. For the same antenna channel, the next data sample, $x_1(t_2)$, is generated at time $t_2=t_1+\Delta t$. For the ith antenna, at time $t_N$, the component of the data vector would be $x_i(t_N)=x_i(t_1+(N-1)\Delta t)$. Thus, the column showing the components of each $x_i(t_N)$ is simply the ADC output corresponding to sample durations for each $\Delta t$.

Figure 2:
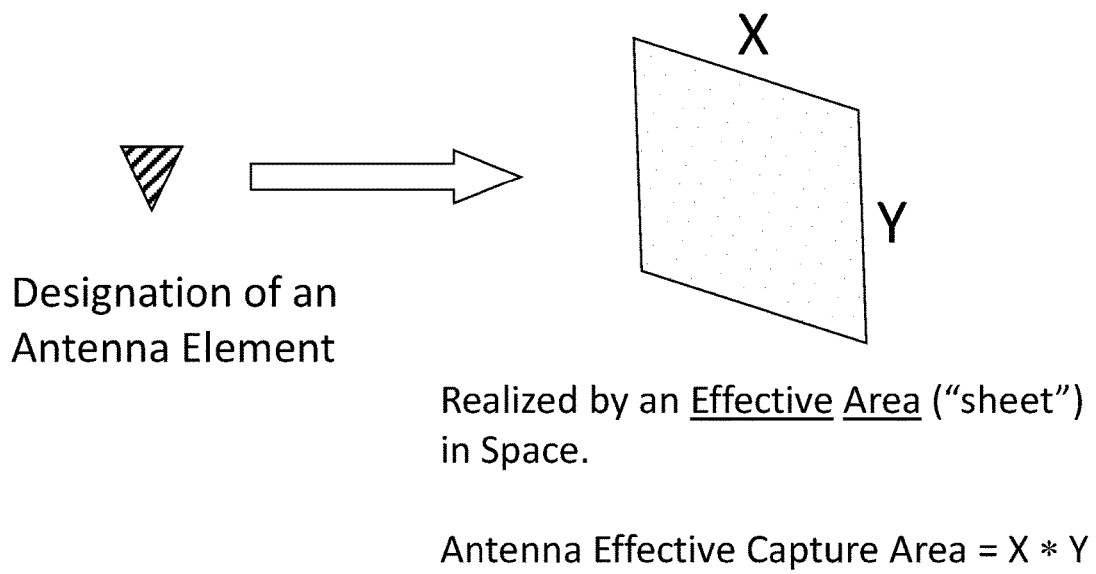
FIG. 2 illustrates an area equivalence model for an antenna.

FIG. 2 shows the equivalence for the designation of a single antenna as an "area" of space, that is the effective capture area in space of the antenna. This is since an antenna absorbs electric fields and thus power, from a given area of space, perpendicular to the line or propagation of the signal. Note, that capture area of an antenna is not necessarily equal to the physical area or size of an antenna.

Figure 3:
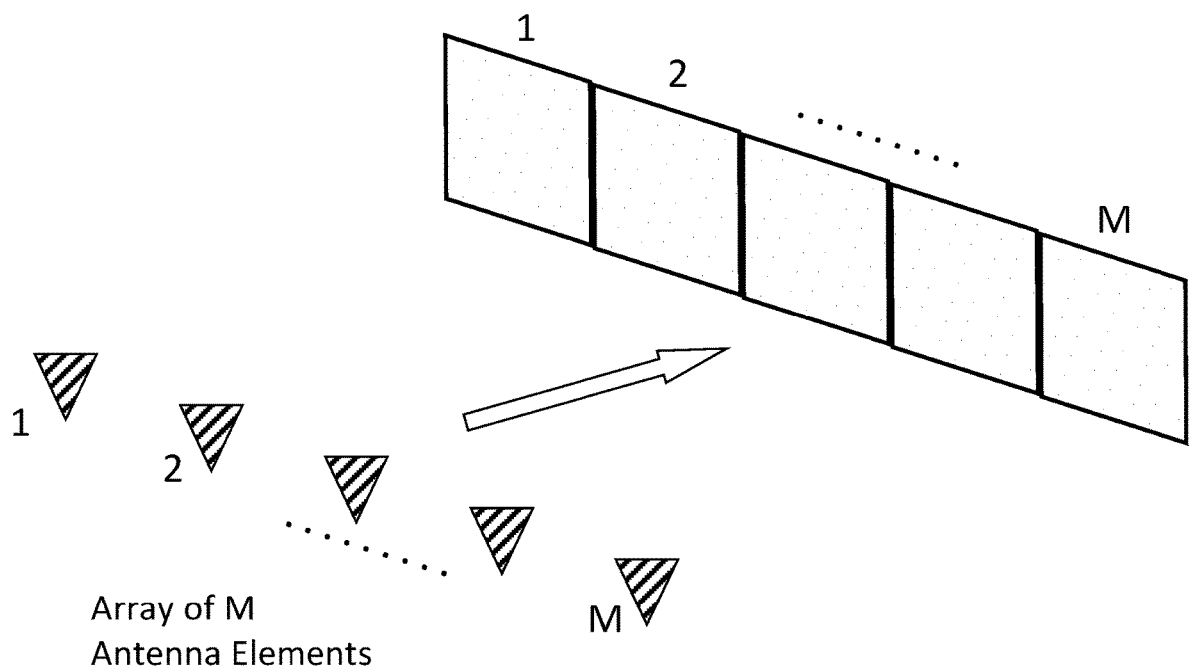
FIG. 3 shows a Set of M antennas, in a linear array, equivalent to 4 rectangular capture areas.

Using this equivalence model, we can extend capture area of an array of M antennas (or sensors) as a contiguous set of areas in space, as shown in FIG. 3. In a simple sense, each of the antennas, designated by an antenna symbol, on the left, can be modeled as a physical capture area, as shown on the right. Each of these capture areas, absorbs the expanding wave front, from a far field source or reflection (as in Radar), and converts the captured field to a voltage (amplitude and phase) at each antenna feed.

Figure 4:
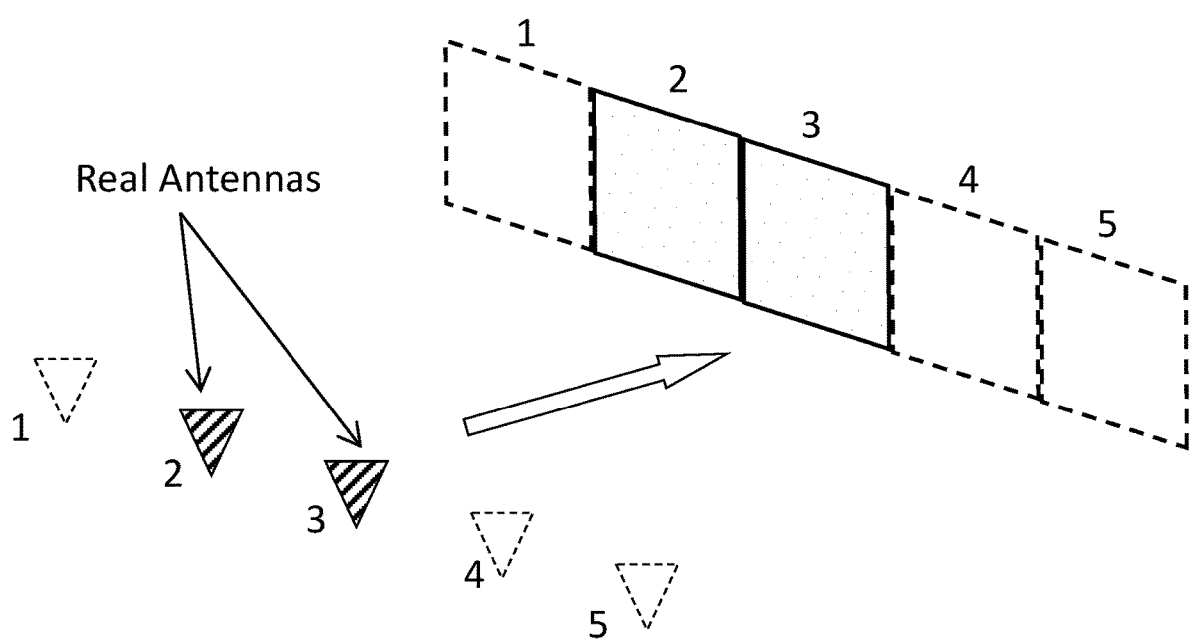
FIG. 4 illustrates a Passive Synthetic Array Goal.

FIG. 4 shows a set of two [real] antennas (shaded), at locations 2 and 3, and desired synthetic antennas at locations 1, 4, and 5. For this system, M=2 (Real Antennas). We desire an array response of 5 antennas, but do not have real antennas at positions 1, 4, and 5, to capture the signal and port the captured energy within these areas, to an antenna feed point (at positions 1, 4, and 5).

Figure 5:
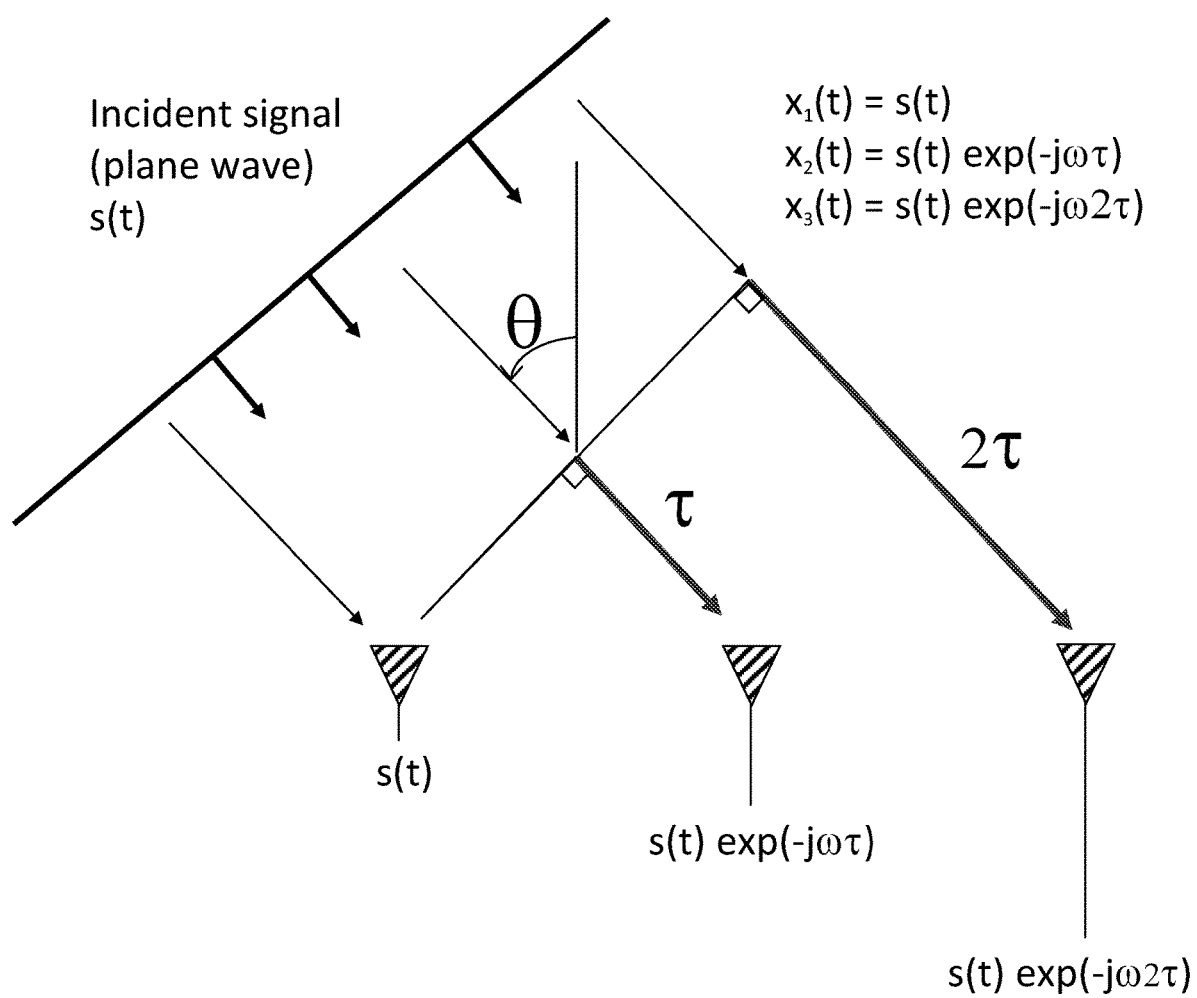
FIG. 5 shows an Interferometric model for the Real Array.

The diagram in FIG. 5 shows the Interferometric model for three (M=3) real antennas. This model now uses the antenna symbols, and not capture areas. A Far Field plane wave is shown on the left, which is incident in the direction of $\theta$ offset to the normal from the array. Assume that the $1^{st}$ antenna is on the left. Therefore, after downconversion, the relative signal captured by this antenna would be $x_1(t)=s(t)$. Note, the steering vector delay component has been omitted for this antenna channel, since we have normalized all antenna channels to antenna channel #1.

For all remaining relationships and diagrams, the noise vector, n(t), will be omitted and assumed to be minor, the elevation spatial dimension will be assumed to be zero, and the carrier frequency common across all elements. Without loss of generality, all expressions that follow, and only use azimuth, can be easily extended to both azimuth and elevation. Therefore:

$$\underline{a}(\theta,\phi,f) \Rightarrow \underline{a}(\theta)$$

Note that the model in the single spatial (azimuth) dimension can be extended to both spatial dimensions, in both azimuth and elevation, without any loss of generality.

Therefore, including delay phase:

$$x_2(t) = s(t) \cdot a_2(\theta)$$
$$= s(t) \cdot e^{-j\omega\tau}$$

Where the steering vector component $a_2(\theta)$ has been substituted for the complex phase delay, $e^{-j\omega\tau}$. Note, that the interferometric time delay value, $\tau$, for the linear array model can be expressed as:

$$\tau = \frac{d \cdot \sin(\theta)}{c}$$

Where
d=spacing (length) between antennas (sensors) in the linear array, and
c=speed of light.

The response for the $3^{rd}$ antenna (sensor) can be therefore expressed as:

$$x_3(t) = s(t) \cdot a_3(\theta)$$
$$= s(t) \cdot e^{-j\omega 2\tau}$$

The first novelty of the invention now includes an ADC rate at a much higher sampling rate. This rate will be represented as P times the original rate of $f_s$, or:

$$f_{ss} = P \cdot f_s$$
$$= P \cdot \frac{1}{\Delta t}$$

Note also that the new sample period, $\Delta t_s$, can be expressed as a function of the original sample period, $\Delta t$, as:

$$\Delta t_s = \frac{\Delta t}{P}$$

That is, the sample period for the over-sampled rate is P times shorter (smaller) than the original rate.

Figure 6:
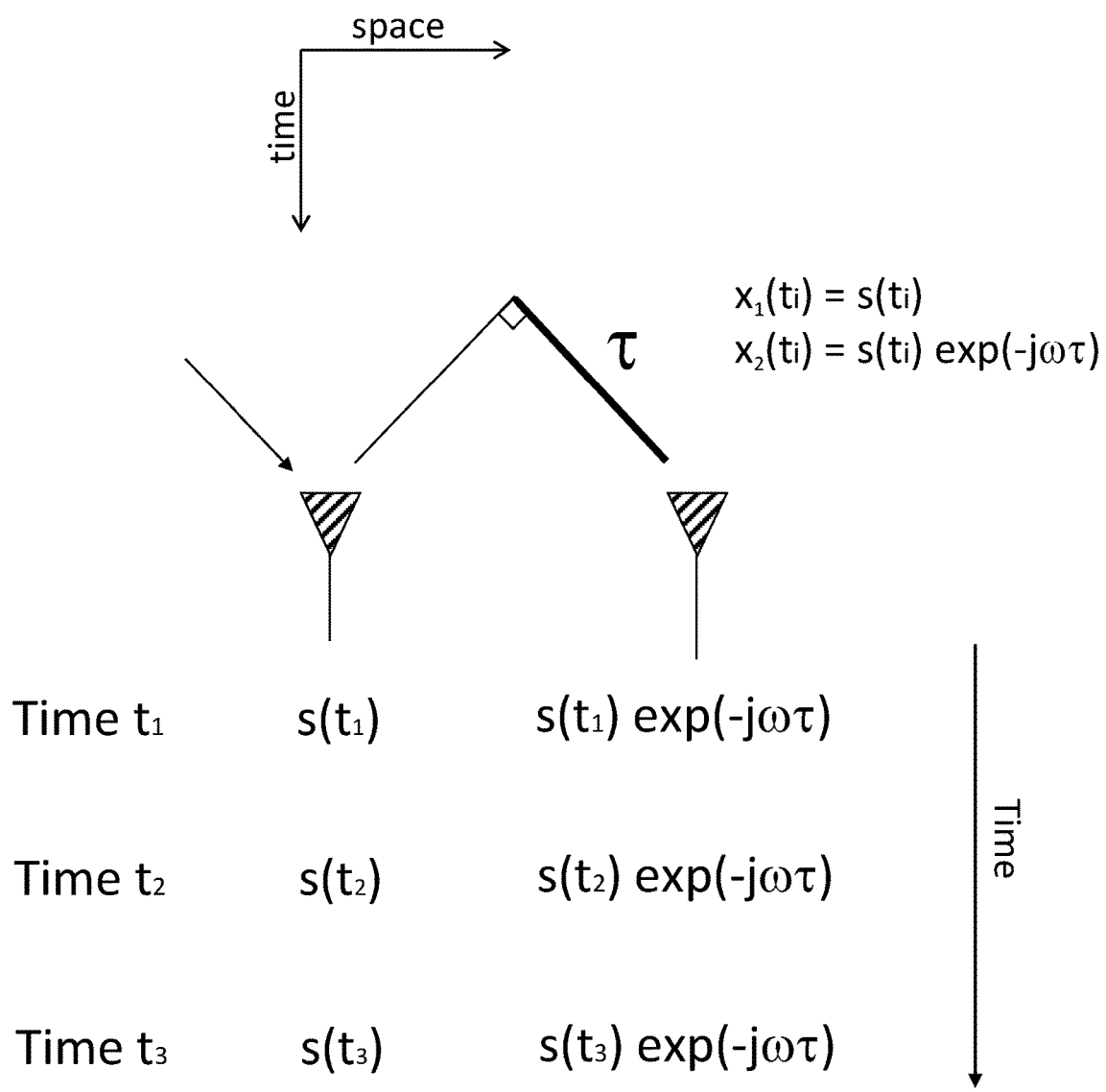
FIG. 6 illustrates ADC outputs, in time, for the first two real antennas (sensors).

FIG. 6 shows the ADC outputs for the first two antennas, shown as columns versus time, but now with the time samples corresponding to the over-sampled rate, e.g. $t_2=t_1+\Delta t_s$.

Figure 7:
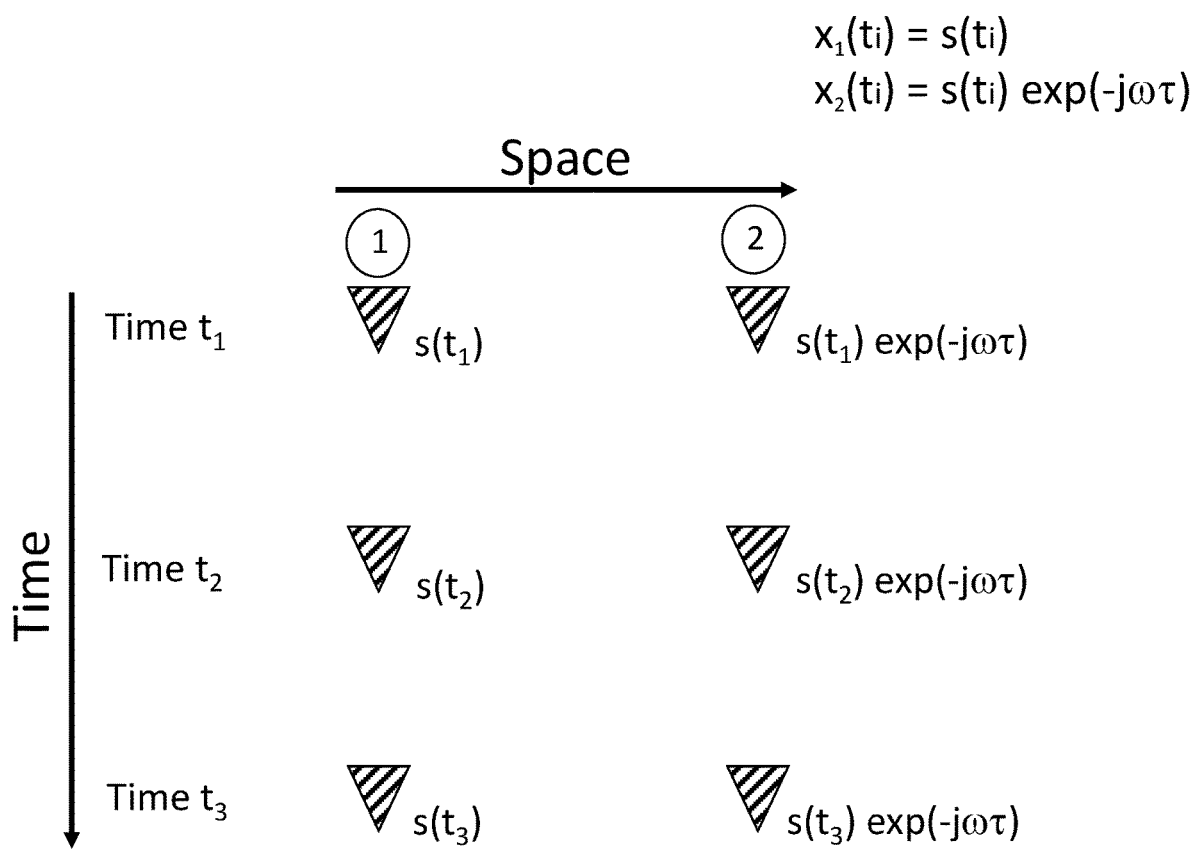
FIG. 7 shows a two antenna model shown in Space-Time.

This can be similarly represented in Space-Time as antenna locations in time, as shown in FIG. 7. In this figure, each time interval represents a "Digital Snapshot" of the array response, which is represented in Hardware by the Output from an Analog-to-Digital (A/D) converter, with a sample rate of $f_{ss}$.

Figure 8:
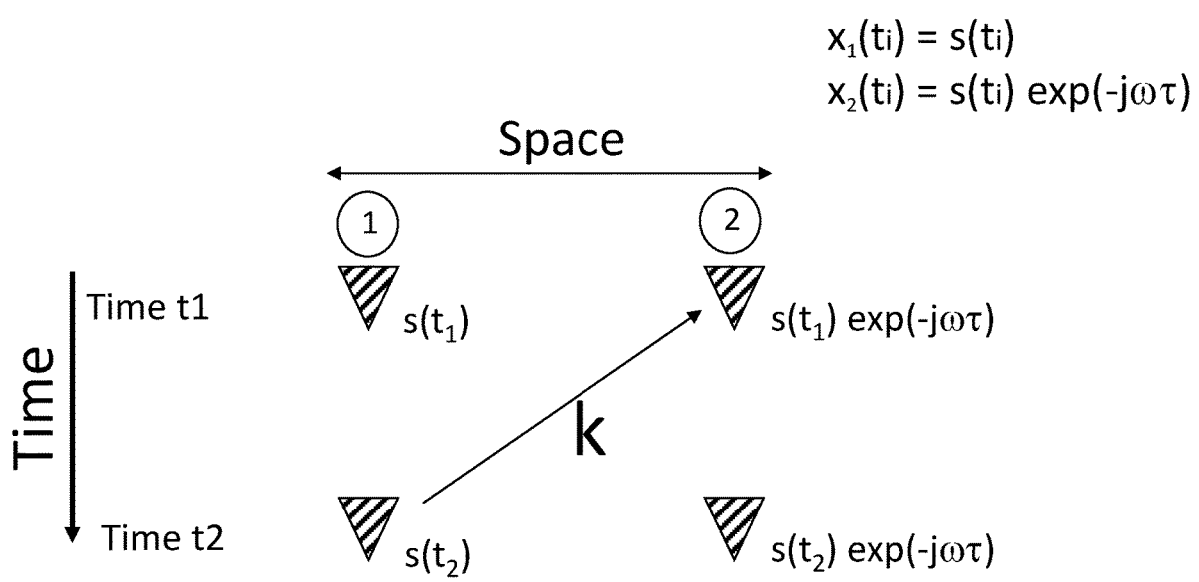
FIG. 8 illustrates the use of the shift term k.

We now invoke the shifting element, that correlates the response of antenna #1 at time $t_2$, to the antenna response of antenna #2 at time $t_1$, in the oversampled rate, as shown in FIG. 8. This shift can be represented as:

$$k \cdot x_1(t_2) = x_2(t_1)$$

Or $$k = \frac{x_2(t_1)}{x_1(t_2)}$$

Figure 9:
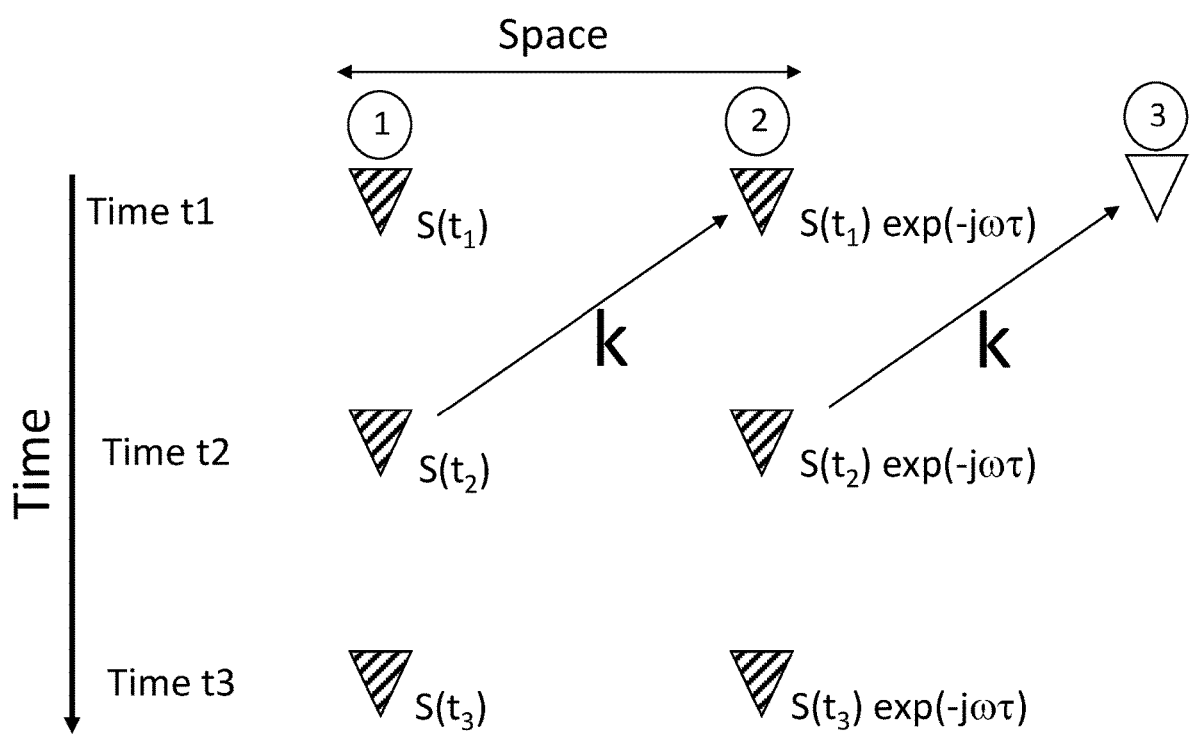
FIG. 9 shows the use of the oversample data and shift term, k, to produce a synthetic antenna #3.

If we now multiple, by k, the value antenna #2 at time period $t_2$, in the oversampled data, we can then construct the synthetic antenna, #3, as shown in FIG. 9, via:

$$k \cdot x_2(t_2) = \frac{x_2(t_1)}{x_1(t_2)} \cdot x_2(t_2)$$
$$= \frac{s(t_1)e^{-j\omega\tau}}{s(t_2)} \cdot s(t_2)e^{-j\omega\tau}$$
$$= s(t_1)e^{-j\omega 2\tau}$$

Which is exactly the value we would expect to obtain if we had a real antenna at position #3, or $x_3(t_1)$. The generation of this synthetic antenna has only used manipulated output ADC values.

This value can now be added to the original data vector set, for time sample #1, where $$\underline{x}(t_1) = [x_1(t_1), x_2(t_1)]$$

is the original data vector for time stamp $t_1$. Notice that this is a 2×1 vector, or a vector of dimension value 2. The new synthesized data vector, including the data sample obtained from the oversampled data set, would be:

$$\underline{x}_s(t_1) = [x_1(t_1), x_2(t_1), x_3(t_1)]$$
$$= [s(t_1), s(t_1)e^{-j\omega\tau}, s(t_1)e^{-j\omega 2\tau}]$$

We can see that this new, increased dimensional, data vector is extremely representative of an array of 3 real sensors. Synthetic values are shown in bold. Without loss of generality, this method can be used to generate much larger effective arrays. This is demonstrated in FIGS. 10 through 13.

Figure 10:
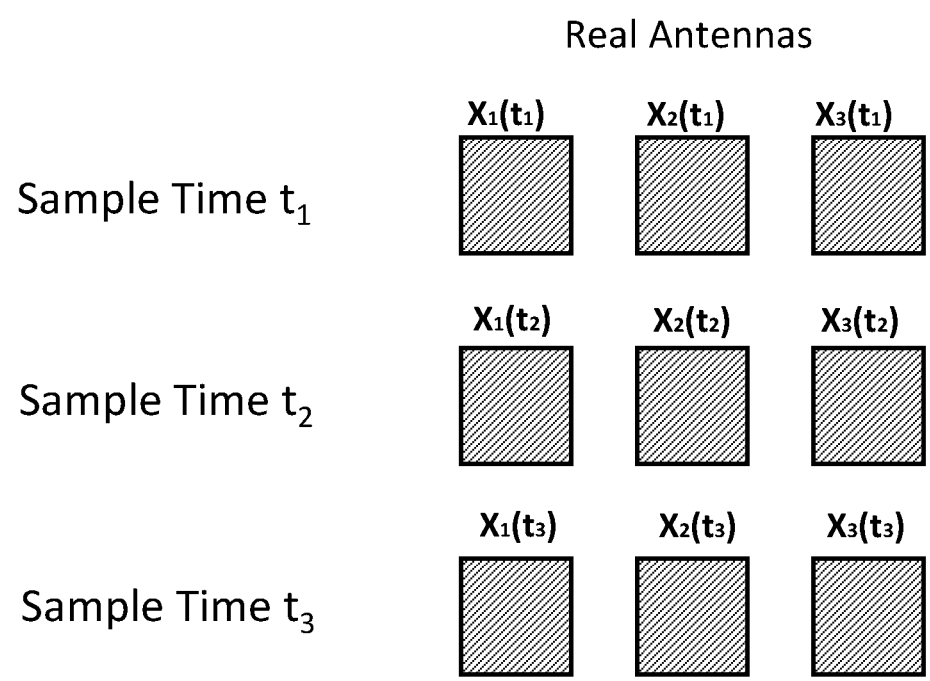
FIG. 10 illustrates a Space-Time representation of a 3 element (antenna) array.

In FIG. 10, we show three antenna elements, with time columns showing the ADC outputs as a function of time. Note, this configuration represents P=1. The data vector obtained from this P=1 sampling is:

$$\underline{x}(t_1) = [x_1(t_1), x_2(t_1), x_3(t_1)] \text{ dimension } 3 \times 1$$

This is the non-synthesized response, from M=3 real antennas.

Figure 11:
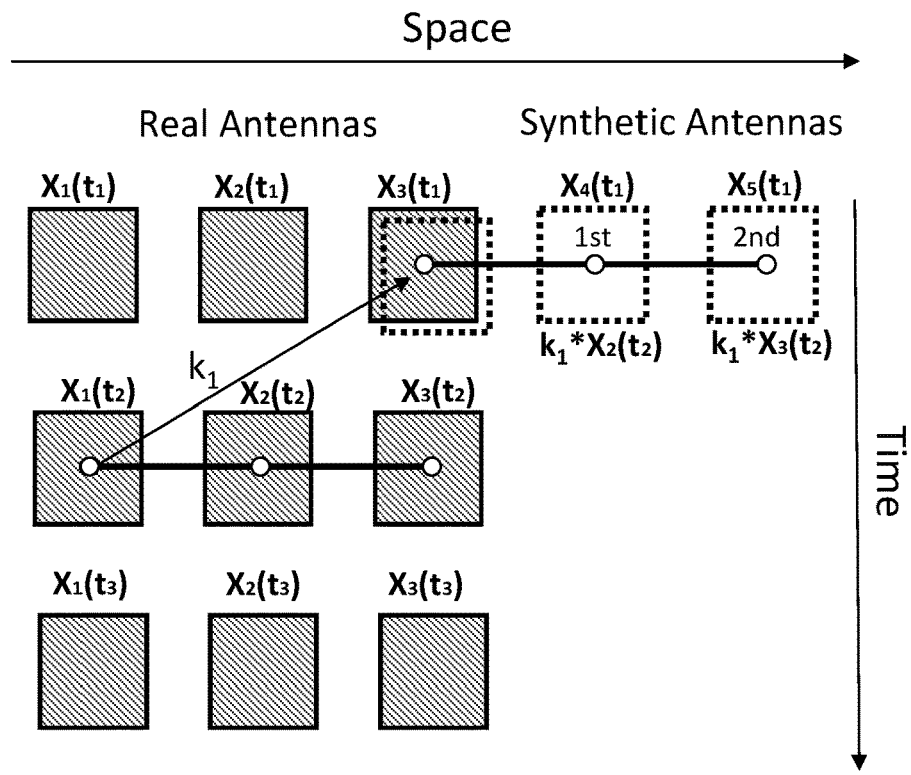
FIG. 11 shows the Generation of two additional (synthetic) array elements, for P=2.

We next compute synthetic terms for P=2 (assuming now that the ADC rate is 2 times the original Nyquist rate):

We now generate two additional elements via the k shifting rule:

$k_1 \cdot x_1(t_2) = x_3(t_1)$ as shown in FIG. 11.

Or $$k_1 = \frac{x_3(t_1)}{x_1(t_2)}$$

The 1$^{st}$ synthetic element is generated using $k_1$ and the $t_2$ sample of element #3:

$$x_4(t_1) = k_1 \cdot x_2(t_2)$$
$$= \frac{x_3(t_1)}{x_1(t_2)} \cdot x_2(t_2)$$
$$= \frac{s(t_1)e^{-j\omega 2\tau}}{s(t_2)} \cdot s(t_2)e^{-j\omega\tau}$$
$$= s(t_1)e^{-j\omega 3\tau}$$

The 2$^{nd}$ synthetic element is generated using $k_1$ and the $t_2$ sample of element #3:

$$x_5(t_1) = k_1 \cdot x_3(t_2)$$
$$= \frac{x_3(t_1)}{x_1(t_2)} \cdot x_3(t_2)$$
$$= \frac{s(t_1)e^{-j\omega 2\tau}}{s(t_2)} \cdot s(t_2)e^{-j\omega 2\tau}$$
$$= s(t_1)e^{-j\omega 4\tau}$$

This results in a new synthetic data vector, of dimension 5×1, as $$\underline{x}_s(t_1) = [x_1(t_1), x_2(t_1), x_3(t_1), \mathbf{x_4(t_1)}, \mathbf{x_5(t_1)}]$$
$$= [s(t_1), s(t_1)e^{-j\omega\tau}, s(t_1)e^{-j\omega 2\tau}, \mathbf{s(t_1)e^{-j\omega 3\tau}}, \mathbf{s(t_1)e^{-j\omega 4\tau}}]$$

Where the elements in bold represent the synthesized data components, for P=2.

Figure 12:
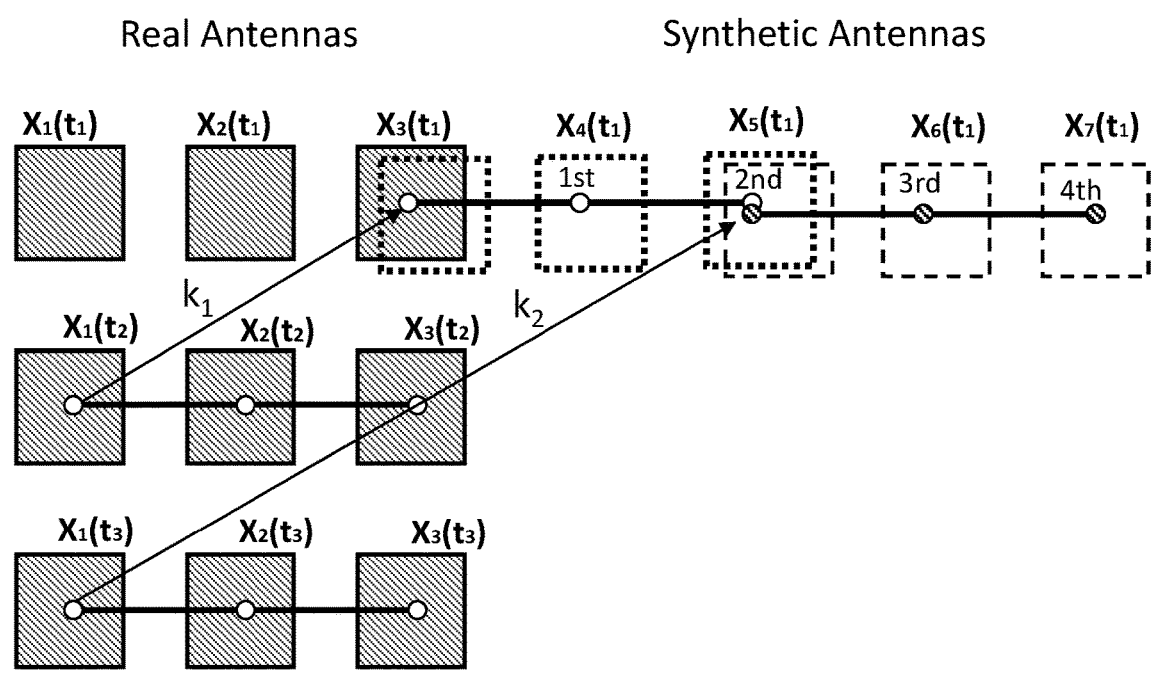
FIG. 12 shows the Generation of additional elements, for P=3.

This can be continued, for P=3, as shown in FIG. 12, (assuming now that the ADC rate is 3 times the original Nyquist rate):

We now generate two more additional elements, in addition to the P=2 synthetic terms, via the k shifting rule:

$$k_2 \cdot x_1(t_2) = x_5(t_1)$$

Or $$k_2 = \frac{x_5(t_1)}{x_1(t_2)}$$

The 3$^{rd}$ synthetic element is generated using $k_2$ and the $t_3$ sample of element #3:

$$x_6(t_1) = k_2 \cdot x_2(t_3)$$
$$= \frac{x_5(t_1)}{x_1(t_2)} \cdot x_2(t_3)$$
$$= \frac{s(t_1)e^{-j\omega 4\tau}}{s(t_2)} \cdot s(t_2)e^{-j\omega\tau}$$
$$= s(t_1)e^{-j\omega 5\tau}$$

The 4$^{th}$ synthetic element is generated using k and the $t_2$ sample of element #3

$$x_7(t_1) = k \cdot x_3(t_3)$$
$$= \frac{x_5(t_1)}{x_1(t_2)} \cdot x_3(t_3)$$
$$= \frac{s(t_1)e^{-j\omega 4\tau}}{s(t_2)} \cdot s(t_2)e^{-j\omega 2\tau}$$
$$= s(t_1)e^{-j\omega 6\tau}$$

This results in a new synthetic data vector, of dimension 7×1, as $$\underline{x}_s(t_1) = [x_1(t_1), x_2(t_1), x_3(t_1), x_4(t_1), x_5(t_1), x_6(t_1), x_7(t_1)]$$

Where the elements in bold represent the synthesized data components.

We can see that without loss of generality, that we can continue this process, for very high P values. The limit is the maximum rate of the ADC, for a given number of desired bits, or Effective Number of Bits (ENOB). That is, if a 16-bit response is desired, and for example the original signal bandwidth is 1 MHz, and the maximum ADC rate is 200 MSPS (which results in a maximum samples bandwidth of 100 MHz), the maximum P value will be 100 MHz/1 MHz=100. This can be expressed as:

$$P_{max} = \frac{\frac{1}{2} \cdot \text{Max}ADC \text{ Rate}}{\text{Signal Bandwidth}}$$

It should be noticed that no-where in any derivation have we used known positions or velocities. That is, the technique is "blind", and does not require or use motion or knowledge of motion of the array. In fact, this technique can be used for arrays and platforms with no motion, at all.

Finally, it should be noted that generation of the Synthetic Data Vector is almost instantaneous, and required no adaptive process or processing.

Extended (Synthesized) Calibration Vector:

Similar to how measured data vectors can be grown and expanded into larger dimension data vectors, so can stored calibration steering vectors, within calibration tables. For example, assume a set of calibration steering vectors (e.g. the Array Manifold], stored within a calibration table. For simplicity, we will assume a fixed frequency calibration table, with no elevation variance; e.g. only varying in azimuth. Therefore:

$$\underline{a}(\theta) = [\underline{a}(\theta_1), \underline{a}(\theta_2), \underline{a}(\theta_3), \ldots, \underline{a}(\theta_N),]$$

For N different stored calibration steering vectors, as a function the azimuth angle, $\theta_i$. Each $\underline{a}(\theta_i)$ represents an M×1 vector, where M is number of real sensors. Therefore, $\underline{a}(\theta)$ is a M×N matrix.

Each $\underline{a}(\theta_i)$ can be represented as $[a_1(\theta_i), a_2(\theta_i), a_3(\theta_i), \ldots, a_M(\theta_i)]$ where each value represents the normalized response, to any given common reference antenna, for each antenna channel. Similar to how we construct the synthetic data vector, $\underline{x}_s$, we construct a synthetic calibration vector, for each calibration angle $\theta_i$ via:

$$k \cdot a_1(\theta_i) = a_M(\theta_i)$$

or $$k = \frac{a_M(\theta_i)}{a_1(\theta_i)}$$

For a given angle $\theta_i$.

For a P=2 System, we would then obtain the synthesized Calibration Vector as follows:

The M+1 (synthetic) element is then:

$$a_{M+1}(\theta_i) = k \cdot a_2(\theta_i)$$
$$= \frac{a_M(\theta_i)}{a_1(\theta_i)} \cdot a_2(\theta_i)$$

The M+2 (synthetic) element is then:

$$a_{M+2}(\theta_i) = k \cdot a_3(\theta_i)$$
$$= \frac{a_M(\theta_i)}{a_1(\theta_i)} \cdot a_3(\theta_i)$$

The M+(M−1) (synthetic) element is then:

$$a_{M+M-1}(\theta_i) = k \cdot a_M(\theta_i)$$
$$= \frac{a_M(\theta_i)}{a_1(\theta_i)} \cdot a_M(\theta_i)$$

This results in a new synthetic calibration steering vector, of dimension M+(M−1), as:

$$\underline{a}_s(\theta_i) = \left[a_1(\theta_i), a_2(\theta_i), \ldots, a_M(\theta_i), \frac{a_M(\theta_i)}{a_1(\theta_i)}[a_2(\theta_i), \ldots, a_M(\theta_i)]\right]$$

which contains M+(M−1)(P−1)=M+(M−1)(1)=2M−1 components, and where the elements in bold represent the synthesized data components.

For a P=3 System, this would generate a new synthetic Calibration vector, of:

$$\underline{a}_s(\theta_i) = \Big[a_1(\theta_i), a_2(\theta_i), \ldots, a_M(\theta_i),$$
$$\frac{a_M(\theta_i)}{a_1(\theta_i)}[a_2(\theta_i), \ldots, a_M(\theta_i)], \frac{a_M(\theta_i)}{a_1(\theta_i)}\frac{a_M(\theta_i)}{a_1(\theta_1)}[a_2(\theta_i), \ldots, a_M(\theta_i)]\Big]$$

which contains M+(M−1)(P−1)=M+(M−1)(2)=3M−2 components.

We can see that for a P=100 system, would contain M+(M−1)(P−1)=M+(M−1)(99)=100M−99 components, which would be representative of a very large array, with very many antenna elements, and a very large L, resulting in a very narrow beamwidth.

For a generic P system, this would be extended to a [M+(M−1)(P−1)]×1 Synthesized Calibration steering vector.

Finally, it should be noted that generation of the Synthetic Calibration Steering Vector is almost instantaneous, and required no adaptive process or processing. It is computed from simply stored values within the calibration table.

Beamform Using Oversampled Data Vector and Synthesized Cal Vector:

The Array Factor, for a given direction of arrival can be expressed as:

$$AF(\theta_i) = \underline{w}^T \cdot \underline{a}(\theta_i)$$

Where $\underline{a}(\theta_i)$=the array steering vector for the direction $\theta_i$ $\underline{w}$=set of complex weights, and T=transpose operator The radiation pattern, for a given direction, $\theta_o$, can be obtained by sweeping the steering vector across all i values, i=1, 2, . . . , N, or through the set $[\theta_1, \theta_2, \ldots, \theta_N]$, and setting $\underline{w}=\text{conj}(\underline{a}(\theta_o))$, where conj means the complex conjugate. Therefore, the radiation pattern would be obtained by computing:

$$AF(\theta_o) = \underline{a}^*(\theta_o) \cdot \underline{a}(\theta_i)$$

for i=1, 2, . . . , N

Digital beamforming can be defined as multiplying a set of data weights, in this case the measured data vector response of the array, by a given desired steer direction (steering vector) of the array.

For a given vector data sample, x(t), the beamformed (inner product) response in the $\theta_o$ direction would be:

$$\text{BF response} = \underline{x}(t)^* \cdot \underline{a}(\theta_o)^* = \text{complex conjugate}$$

This will be a maximum when $\underline{x}(t) = \underline{a}(\theta_o)$.

To narrow the beamwidth of an M antenna (array) system, we would use the Synthesized Data Vector, $\underline{x}_s(t)$ as well as the synthesized Calibration Vector, $\underline{a}_s(\theta_0)$, and compute their inner product as:

$$\text{Synthetic BF response} = \underline{x}_s^*(t) \cdot \underline{a}_s(\theta_o)$$

Note each vector should have the same dimension: [M+(M−1)(P−1)]×1

Figure 13:
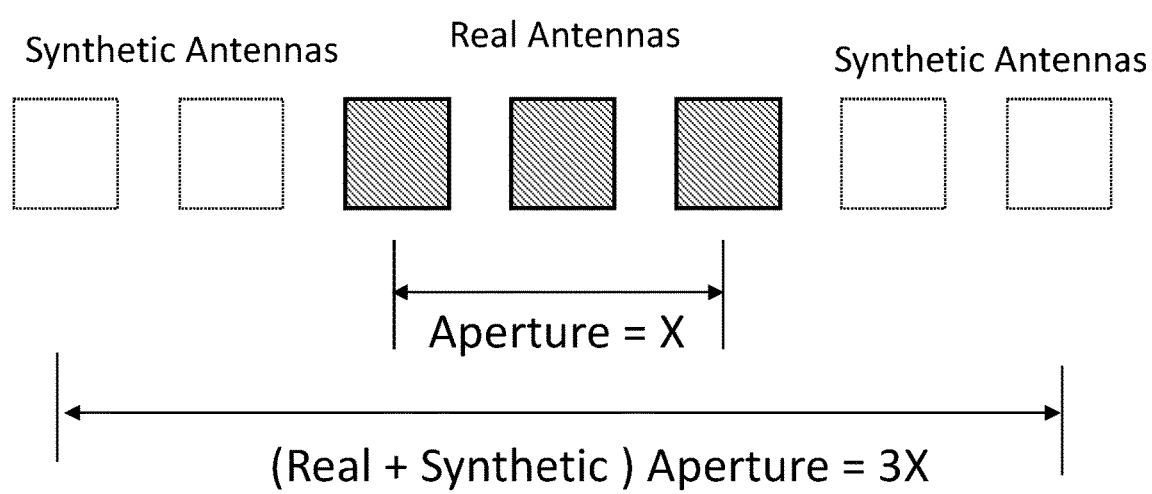
FIG. 13 illustrates the Aperture of Real Array versus the (larger) aperture of the (Real+Synthetic) Array.

Ideally, for an M element array, the Beamformed Array Gain for the system would be M, for a system of unity gain isotropic radiators. Additionally, the effective beamwidth is narrowed as M increases, assuming equal separation of antennas within the array. As shown in FIG. 13, assume the effective Aperture (distance between both end antennas) is X (not to be confused with "small" x). Assume that the beamwidth of this system is Y. Then for the system with 4 additional synthetic antennas, as shown, the effective Aperture would increase by 3 times (P=3). This would result in an effective beamwidth of Y/3, for this system of 3 Real antennas plus 4 Synthetic Antennas.

Figure 14:
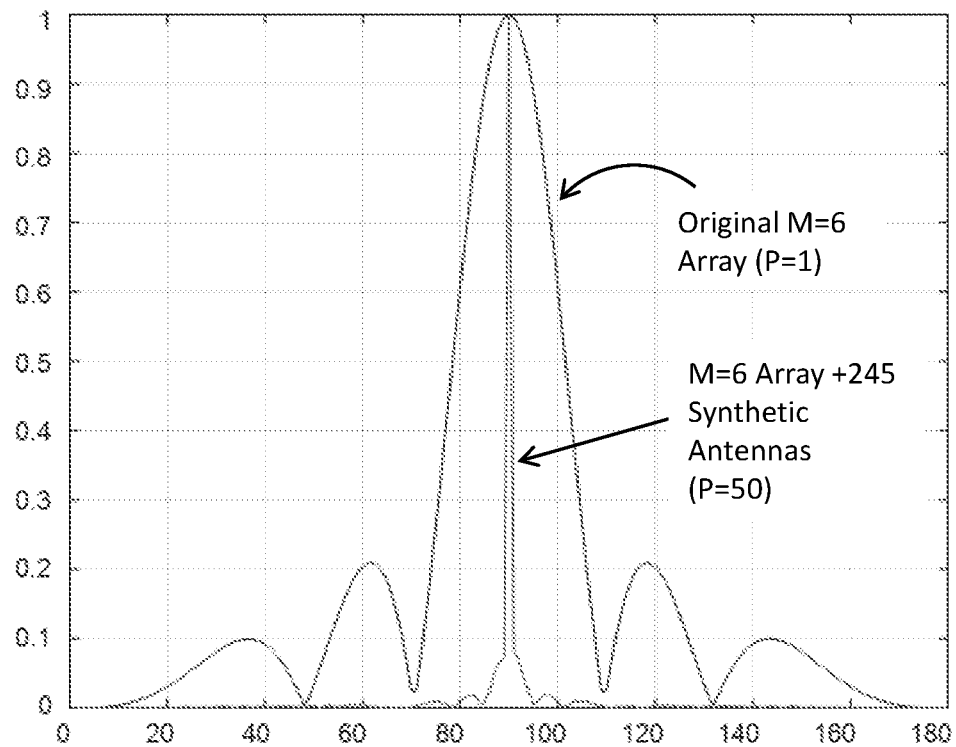
FIG. 14 shows the Normalized Array Factor for M=6, with half-wavelength spacings.
Figure 15:
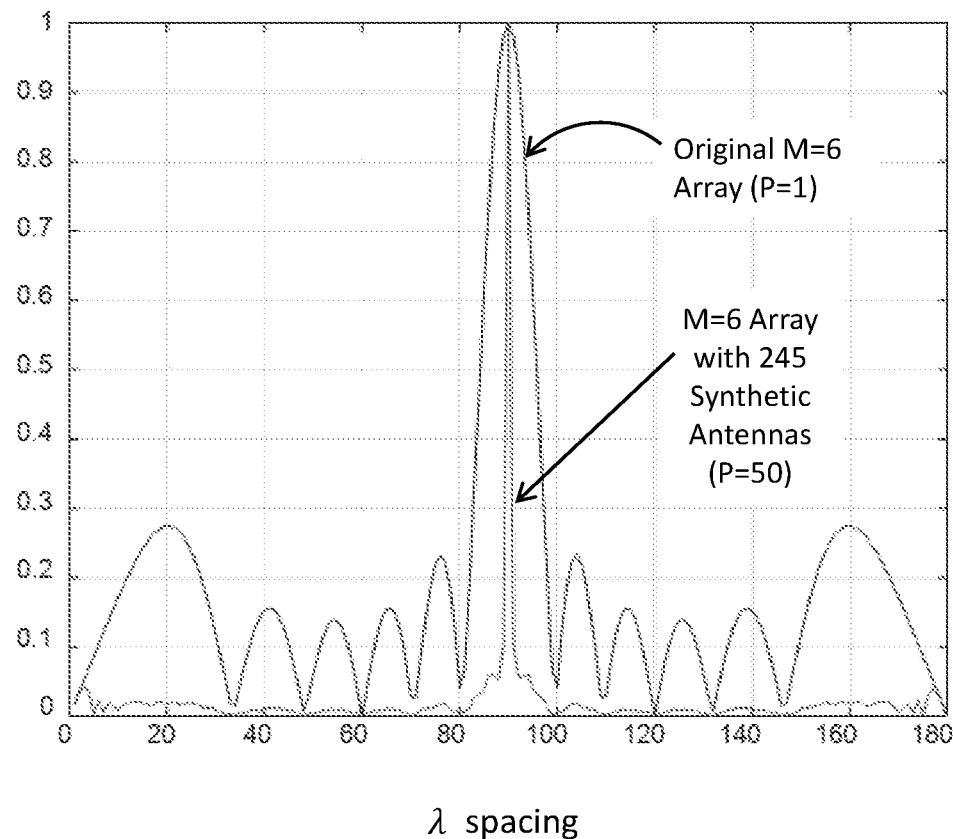
FIG. 15 illustrates a simulation of six antennas spaced a full wavelength from one another.

FIG. 14 shows the simulated results for an [linear] array of 6 Real antennas, space half-wavelength from each other. The wide curve represents the Array Factor for the 6 Real Antennas (only). The narrow curve represents the case for P=50, or roughly 49*(6−1)=245 additional (synthetic) antennas.

The next simulation shows the model for 6 antennas spaced a full wavelength from one another. Notice that the wider (6 Real Antennas only) curve shows numerous high grating lobes.

Key Novelties and Benefits of the Invention:

Generation of narrowed received beams

Generation of narrowed received beams for multiple received signals

Use of oversampled signal(s)

Fs much greater than the minimum Nyquist Rate

Use of Calibration vector extension; Synthesized Calibration Vector

Multiplication (inner product) of the Synthesized Data Vector by the Synthesized Cal Vector Use of a Stored (Real) Calibration Vector Results in an [M+(M−1)(P−1)]×1 resultant Data Vector Results in a new (higher dimension) [M+(M−1)(P−1)]×1 resultant Calibration Vector Results in an [M+(M−1)(P−1)]×N resultant Data Set The key benefits to this technology are Beamwidth Reduction (this is the primary benefit), Reduction of Beam Sidelobe levels, Reduction of Grating Lobes, and additional beamform gain.

While U.S. Pat. No. 7,250,905 B2 (dated Jul. 31, 2007), abandoned, "Virtual Antenna Technology (VAT) and Applications", also describes a mechanism for the generation of virtual antennas in a patch array, this patent does not mention Oversampling, use of an extended Calibration Vector, nor (inner product) multiplication of the synthesized data vector by a synthesized Cal vector.

REFERENCES (INCORPORATED HEREIN BY REFERENCE)

Judd, M. (2007) U.S. Pat. No. 7,250,905 B2

What is claimed is:

1. A method to generate a narrow beamwidth or plurality of narrow beamwidths in a phased array receive system of M Radio Frequency antennas, or acoustic transducers, which overcomes the half power beamwidth limitation of 2*π*λ/L, wherein
   a. L is the maximum end-to-end aperture or size of the phased array, and
   b. λ is the RF wavelength of the system, and
   c. said method uses over-sampling of the received signal faster than the traditional Nyquist Sampling Rate, by a multiplicative factor of P, using high speed Analog to Digital Converters to produce additional vector signal data samples that are time shifted, and phase and amplitude correlated with Nyquist Rate vector signal data samples, and
   d. the oversampled vector signals samples, from each of the M antennas, are used to construct a synthesized higher dimensional signal data vector as well as a synthesized calibration data vector, which each represent a nearly exact representation of the same sized higher dimension data and calibration vectors of a real array of M+(P−1)(M−1) real antennas, and
   e. wherein the two higher dimensional synthesized data and calibration vectors are multiplied together to produce an array response with narrower beamwidth by a factor of roughly P times, and higher received array gain by a factor of P times, and
   f. where the limit of the performance increase in narrower bandwidth, greater gain, and reduced echo clutter is only limited by the ratio P, of the oversampled data rate to the original Nyquist sampling rate for the desired signal bandwidth.

2. The method of claim 1 which reduces interference levels as well as rejection of unwanted or undesired signals, arriving from directions not along the line or path from the desired signal source or echo source, and the center of the receive array of M antennas.

3. The method of claim 1 which results in the generation of narrower received beamwidths for a multiplicity of incident signals to the array of M antennas.

4. The method of claim 1 where the oversampled rate Fs, for every antenna output in the array of M antennas is greater than the minimum Nyquist Rate, fs, of the received signal and is expressed as Fs equals P times fs, therefore the sample period for the oversampled signal, $\Delta t_s$, is smaller than that for the original Nyquist rate sample period of $\Delta t$, where $\Delta t_s = \Delta t$ divided by P.

5. The method of claim 1 that computes a shifting element computed from an oversampled component of an earlier or later sampled time, to the reference time of the original Nyquist rate, fs, that correlates the response of antenna #1 at time $t_2$, to the antenna response of antenna #M at time $t_1$, in the oversampled rate, or conversely of antenna #M at time $t_2$, to the antenna response of antenna #1 at time $t_1$, and uses this correlation shifting value to be multiplied by the remaining M−1 antennas at the oversampled time of $t_2$, and thus generates M−1 synthesized antenna values for time $t_1$, which are effectively identical to values received from a far field signal to real and physical M−1 antennas at respective positions next to the original array of M real antennas, and repeats this process for p=2, . . . , P times, to generate and additional M−1 antennas P−1 times, for a total number of (M−1)(P−1) synthetic antennas.

6. The method of claim 1 where (M−1)(P−1) synthetic antenna vector data samples in the new array have been generated via only manipulation and mathematical multiplication, addition, and division using vector data samples from the oversampled data set of the original real M antennas, from M high speed analog to digital converters in the multichannel receiver.

7. The method of claim 1 where the original M antenna data vector response of $\underline{x}(t_1) = [x_1(t_1), x_2(t_1), \ldots, x_M(t_1)]$, of vector size 1×M, is augmented with the correlated and shifted computed synthetic sensors $x_{M+i}(t_1), \ldots, x_{2M}(t_1)$, of vector dimension 1×(M−1), to produce a higher dimension $\underline{x}(t_1) = [x_1(t_1), x_2(t_1), \ldots, x_M(t_1), x_{M+1}(t_1), \ldots, x_{2M}(t_1)]$, and to continue this process with the (P−1) addition of M−1 synthesized vector data sets, obtained from the oversampled data, to produce a final higher dimension real plus a synthesized data vector $\underline{x}(t_1) = [x_1(t_1), x_2(t_1), \ldots, x_M(t_1), x_{M+1}(t_1), \ldots, x_{M+(M-1)(P-1)}(t_1)]$, of vector dimension M+(M−1)(P−1), and without loss of generality, this method can be used to generate much larger receive array data vector responses of order M+(M−1)(P−1) from a real array of only M antennas.

8. The method of claim 1 where the maximum value of P is equal to one-half the maximum analog to digital sample rate of the system divided by the incident, return, or echo signal bandwidth.

9. The method of claim 1 where only time shifting and position shifting is used for the generation of a synthetic data vector, which requires no knowledge or data of the positions or orientations of the original real M antennas, nor their velocities or the velocity of the platform that might carry the antennas, the technique is blind and does not require or use motion or knowledge of motion of the array, and this technique can be used for arrays and platforms with no motion at all.

10. The method of claim 1 where the generation of the synthetic data vector is almost instantaneous and requires no adaptive process or space time adaptive processing.

11. The method of claim 1 where a calibration data vector is constructed from a given far field source signal, using oversampled data from each antenna, at each azimuth, $\theta$, and elevation, $\phi$, angle and averaging the synthesized data vector for N full M+(M−1)(P−1)*$\Delta t_s$ time periods to produce an estimate for the expected value of a calibrated steering vector, $\underline{a}(\theta,\phi)$ of dimension 1×M+(M−1)(P−1), and store each of these calibration vectors to generate a synthesized array manifold of dimension $N_\theta \times N_\phi \times [M+(M-1)(P-1)]$, where $N_\theta$ and $N_\phi$ are the number of azimuth vector components and elevation vector components, respectively.

12. The method of claim 1 where only time shifting and position shifting is used, for generation of the Synthetic Calibration vector, which requires no knowledge or data of the positions or orientations of the original real M antennas, nor their velocities or the velocity of the platform that might carry the antennas, and the technique is blind, and does not require or use motion or knowledge of motion of the array and this technique can be used for arrays and platforms with no motion at all.

13. The method of claim 1 where the generation of the synthetic calibration vector is computed almost instantaneously and requires no adaptive process or space time adaptive processing.

14. The method of claim 1 that uses the computed and stored synthesized calibration vectors and complex multiply these a with the synthesized data vector, during array operation to produce an array response with narrower beamwidth, equivalent to the a real enlarged array of M+(M−1)(P−1) total antennas.

15. The method of claim 1 which is used to compute an array factor, for a given direction of arrival, $\theta_i$, which can be expressed as: $AF(\theta_i) = \underline{w}^T \cdot \underline{a}(\theta_i)$, where $\underline{w}$ is the synthesized data vector and $\underline{a}(\theta_i)$ is the store calibration vector for incident angle $\theta_i$.

16. The method of claim 1 which digitally beamforms the incident signal, by multiplying via the vector inner product, the new synthesized data vector, w(t), by each vector, $\underline{a}(\theta_i)$, which is the stored synthetic calibration vector for each and every incident angle $\theta_i$, and produces a radiation pattern response for the array: BF response $(\theta_1) = xw(t)^* \cdot \underline{a}(\theta_i)$, where the superscript*denotes a complex conjugate of the vector.

17. The method of claim 1 which digitally beamforms the incident signal, by multiplying via the vector inner product, the new synthesized data vector, w(t), by an optimal calibration vector, $\underline{a}(\theta_o)$, which is chosen from among the stored synthetic calibration vectors in the subset of each and every incident angle $\theta_i$, and produces an optimal beamformed response for the array: BF response $(\theta_o) = w(t)^* \cdot \underline{a}(\theta_o)$, where the superscript*denotes the complex conjugate of the vector.

* * * * *